United States Patent [19]
Moro

[11] Patent Number: 5,629,777
[45] Date of Patent: May 13, 1997

[54] IMAGE FORMING APPARATUS FOR FORMING IMAGE TO EXCLUDE EXTRA-ORIGINAL AREA

[75] Inventor: Akihiro Moro, Kawasaki, Japan

[73] Assignee: Kabushiki Kaisha Toshiba, Kanagawa-Ken, Japan

[21] Appl. No.: 208,982

[22] Filed: Mar. 10, 1994

[30] Foreign Application Priority Data

Mar. 24, 1993 [JP] Japan ................... 5-065256

[51] Int. Cl.$^6$ .................. H04N 1/04; H04N 1/23; H04N 1/38
[52] U.S. Cl. .................. 358/401; 358/464; 358/474
[58] Field of Search .................. 358/464, 488, 358/475, 461, 401, 452, 449, 448, 296, 300, 474, 494, 453, 501, 537, 538, 530; 382/282, 318

[56] References Cited

U.S. PATENT DOCUMENTS

| | | | |
|---|---|---|---|
| 4,435,723 | 3/1984 | Seimiya et al. | 358/300 |
| 5,119,211 | 6/1992 | Sakurai | 358/464 |
| 5,440,403 | 8/1995 | Hashimoto et al. | 358/488 |
| 5,488,491 | 1/1996 | Steinkirchner | 358/464 |
| 5,510,908 | 4/1996 | Watanabe et al. | 358/464 |

FOREIGN PATENT DOCUMENTS 3-17787  1/1991  Japan.

*Primary Examiner*—Scott A. Rogers
*Attorney, Agent, or Firm*—Limbach & Limbach

[57] ABSTRACT

An image forming apparatus includes a first scanning function for radiating light to a target area including an original image area, scanning the target area in a predetermined direction, and converting an optical image obtained by scanning to an electrical signal. A second scanning function is provided for radiating light to the target area including the original image area, scanning the target area in a direction perpendicular to the direction in which the first scanning function scans, and converting an optical image obtained by scanning to an electrical signal. A function means converts the electrical signals converted by the first and second scanning functions to digital signals. Also provided is an area abstracting function for abstracting an area in the target area surrounded by a low-density portion based on the digital signals processed by the converting function, a judging function for judging the area surrounded by the low-density portion as an original area and an area other than the original area as an extra-original area, and an image forming function, which forms an image based on image signals obtained by scanning and conversion by the first and second scanning functions, for forming an image to exclude the extra-original area judged by the judging function.

13 Claims, 9 Drawing Sheets nest(1) = nest(0)

nest(1) = nest(0) + 1

IMAGE FORMING APPARATUS FOR FORMING IMAGE TO EXCLUDE EXTRA-ORIGINAL AREA

BACKGROUND OF THE INVENTION

1. Field of the Invention

The present invention relates, e.g., to a digital copying machine for copying a portion outside an original as a blank.

2. Description of the Related Art

In recent years, a digital copying machine utilizing the digital technique has been developed and put into practical use as a copying machine. More specifically, an image from the original is read by a CCD (charge-coupled device) line sensor, and a signal from the line sensor is processed by quantization.

When a thick original, e.g., a book, is to be copied by using such a digital copying machine, since a platen cover for pressing the original can be closed only halfway, a portion of the platen cover corresponding to the outside of the original floats from the original table and is copied in black. For example, when originals "AAA", "BBB", and "CCC", and a small area such as dust exist on the original table, portions other than the originals "AAA", "BBB", and "CCC", and the small area such as dust are copied in black.

A copying machine has been developed which performs correction in order to whiten an area other than a original. In this copying machine, however, if a plurality of originals "AAA" and "BBB" exist in the main scanning direction, both a portion between the originals "AAA" and "BBB" in the main scanning direction and a portion between a small area and the original "CCC" in the main scanning direction are not judged as portions outside the original. Thus, the portions between the plurality of originals or a portion between the small area and the original in the main scanning direction is treated as a portion where the original exists, and such a portion is copied in black.

SUMMARY OF THE INVENTION

It is an object of the present invention to provide an image forming apparatus which, even when a plurality of originals exist in the main scanning direction, does not copy a portion between adjacent originals in black, and does not copy a portion between a small area and an adjacent original in black.

According to the present invention, there is provided an image forming apparatus comprising: first scanning means for radiating light to a target area including an original image area, scanning the target area in a predetermined direction, and converting an optical image obtained by scanning to an electrical signal; second scanning means for radiating light to the target area including the original image area, scanning the target area in a direction perpendicular to the direction in which the first scanning means scans, and converting an optical image obtained by scanning to an electrical signal; converting means for converting the electrical signals converted by the first and second scanning means to digital signals; area abstracting means for abstracting an area in the target area surrounded by a low-density portion based on the digital signals processed by the converting means; judging means for judging the area surrounded by the low-density portion as an original area and an area other than the original area as an extra-original area; and image forming means, which forms an image based on image signals obtained by scanning and conversion by the first and second scanning means, for forming an image to exclude the extra-original area judged by the judging means.

According to the present invention, the target area is scanned in the two orthogonal directions by the first and second scanning means, as described above. Conventionally, when the target area is scanned in one direction, an image between a plurality of originals that are distributed in this one direction cannot be scanned. However, this conventional problem does not arise in the present invention. More specifically, regarding a plurality of originals that are distributed in the scanning direction of the first scanning means, even a target image in the area between these plurality of originals can be easily scanned by the second scanning means in the direction perpendicular to the scanning direction of the first scanning means. As a result, unlike in the conventional image processing apparatus, an area between the plurality of originals is not erroneously recognized as an area where an original exists, so that this area between the plurality of originals is not copied in black.

Furthermore, according to the present invention, there is also provided an image forming apparatus comprising: scanning means for radiating light to a target area including an original image area, scanning the target area in a predetermined direction, and converting an optical image obtained by scanning to an electrical signal; converting means for converting the electrical signal converted by the scanning means to a digital signal; area abstracting means for abstracting an area in the target area surrounded by a low-density portion based on the digital signal processed by the converting means; judging means for judging, when the area abstracted by the area abstracting means has a size not less than a predetermined range, this area as an original area and an area other than the original area as an extra-original area; and image forming means, which forms an image based on an image signal converted by the converting means, for forming an image to exclude the extra-original area judged by the judging means.

According to the present invention, when an area abstracted by the area abstracting means has a size equal to or larger than the predetermined range, the judging means which judges this area as an original area, and an area outside this original area as an extra-original area is employed. Thus, a noise portion of small dust or the like, which is judged as an original area by the conventional original area recognizing function, is judged to have a size of less than the predetermined range and judged as thus an extra-original area. Then, a portion, e.g., a dust portion, other than the original area will not be erroneously recognized as a portion where an original exists, so a portion other than the original will not be unnecessarily copied.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
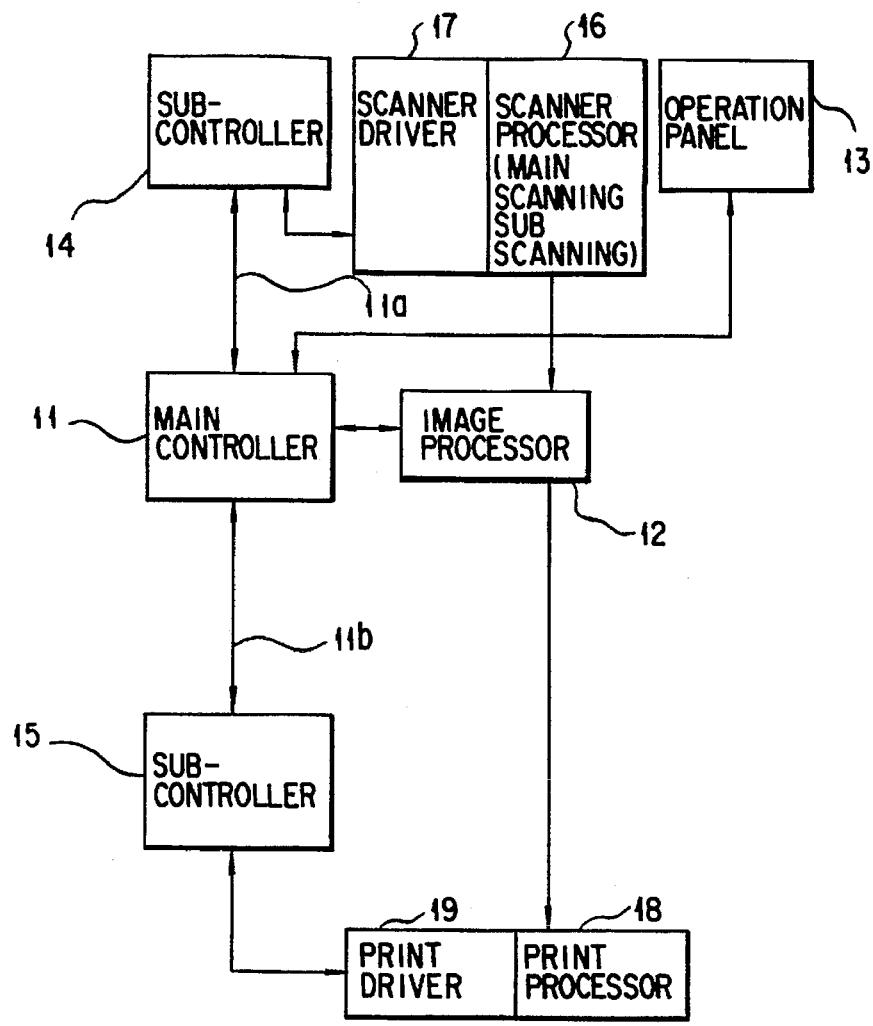
FIG. 1 is a block diagram showing the schematic arrangement of a digital copying machine according to an embodiment of the present invention.
Figure 2:
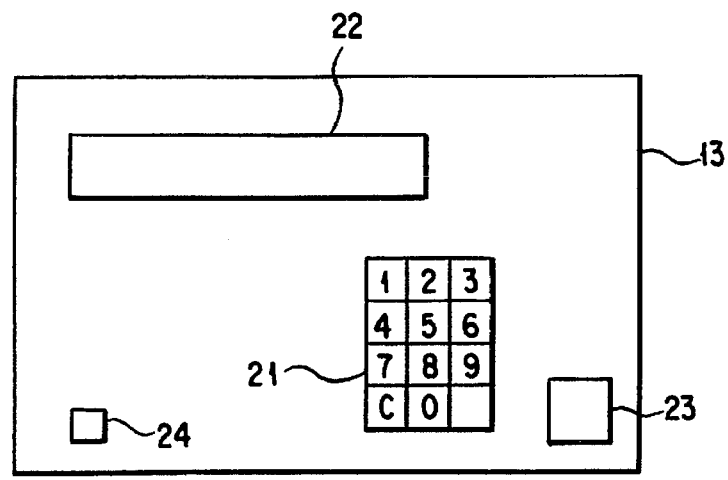
FIG. 2 is a plan view of an operation panel according to the embodiment of the present invention.
Figure 3:
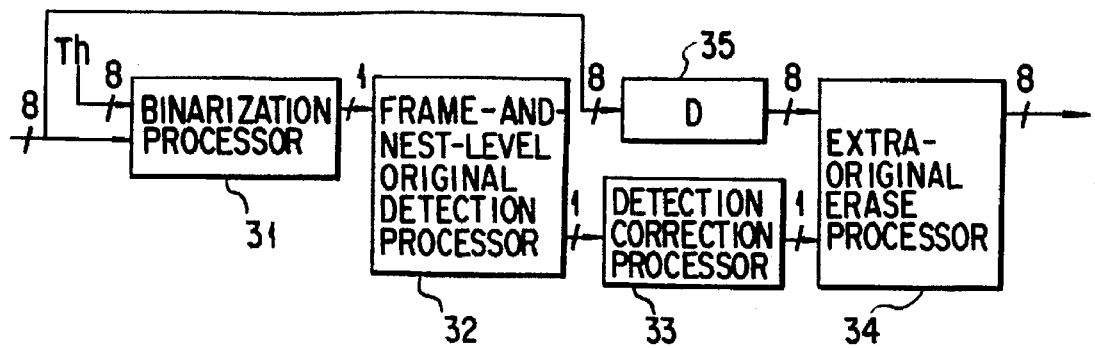
FIG. 3 is a block diagram showing the main part of an image processor according to the embodiment of the present invention.

An image forming apparatus according to an embodiment of the present invention will be described with reference to the accompanying drawings. FIG. 1 is a diagram showing the schematic arrangement of a digital copying machine as an image forming apparatus. FIG. 2 is a plan view of an operation panel. FIG. 3 is a block diagram showing the main part of an image processor.

FIG. 1 shows a main controller 11 for totally controlling the digital copying machine. The main controller 11 has a CPU, a RAM storing, e.g., a control program and parameters of an extra-original erase mode (to be described later), a RAM for storing various types of data, and the like.

The main controller 11 is connected to an image processor 12 and an operation panel 13 as shown in FIG. 2. The image processor 12 processes image data sent from a scanner processor (to be described later) in a manner as shown in the block diagram in FIG. 3, and compresses/expands the image data.

As shown in FIG. 2, the operation panel 13 has a ten-key input section 21, a message display 22, a print key 23, and an extra-original erase mode switch 24.

The main controller 11 is connected to a sub-controller 14 through a communication line 11a. The sub-controller 14 totally controls photoelectric conversion by the CCD, and comprises a CPU, a ROM storing a control program for controlling scanner processing, and a RAM for storing, e.g., scanned image data, and the like.

The main controller 11 is also connected to a sub-controller 15 through a communication line 11b. The sub-controller 15 totally controls print output processing by means of a laser beam, and comprises a CPU, a ROM storing a control program, a RAM for storing print data, and the like.

The sub-controller 14 is connected to a scanner processor 16 and a scanner driver 17. The scanner processor 16 causes the CCD to photoelectrically convert light reflected by the original, thus A/D-converting analog image data to 8-bit image data, and causes the line memory to store the 8-bit image data as 1-line image data. The scanner driver 17 scans the light source. The scanner processor 16 outputs 1-line image data to the image processor 12.

The sub-controller 15 is connected to a print processor 18 and a print driver 19. The print processor 18 performs print output processing by means of a laser beam. The print driver 19 drives various types of driving sources accompanying print output processing.

The arrangement of the main part of the present invention will be described with reference to FIG. 3. The image data (8 bits) output from the scanner processor 16 is input to a binarization processor 31 in the image processor 12. The binarization processor 31 compares 8-bit input image data with an 8-bit threshold Th (e.g., "E0"). If image data≧threshold Th, the binarization processor 31 outputs a binary output of "0"; if image data<threshold Th, it outputs a binary output of "1".

The binary signal output from the binarization processor 31 is input to a frame-and-nest-level original detection processor 32. The frame-and-nest-level original detection processor 32 calculates the frame of the original and a nest level, that are expressed by binary signals, based on the principle of an intra-frame area detecting apparatus disclosed in Jpn. Pat. Appln. KOKAI Publication No. 3-17787. The binary signals as detection outputs representing the calculated original frame and the nest level are output to a detection correction processor 33.

The principle of this intra-frame area detecting apparatus will be described with reference to the accompanying drawings.

Figure 5A:
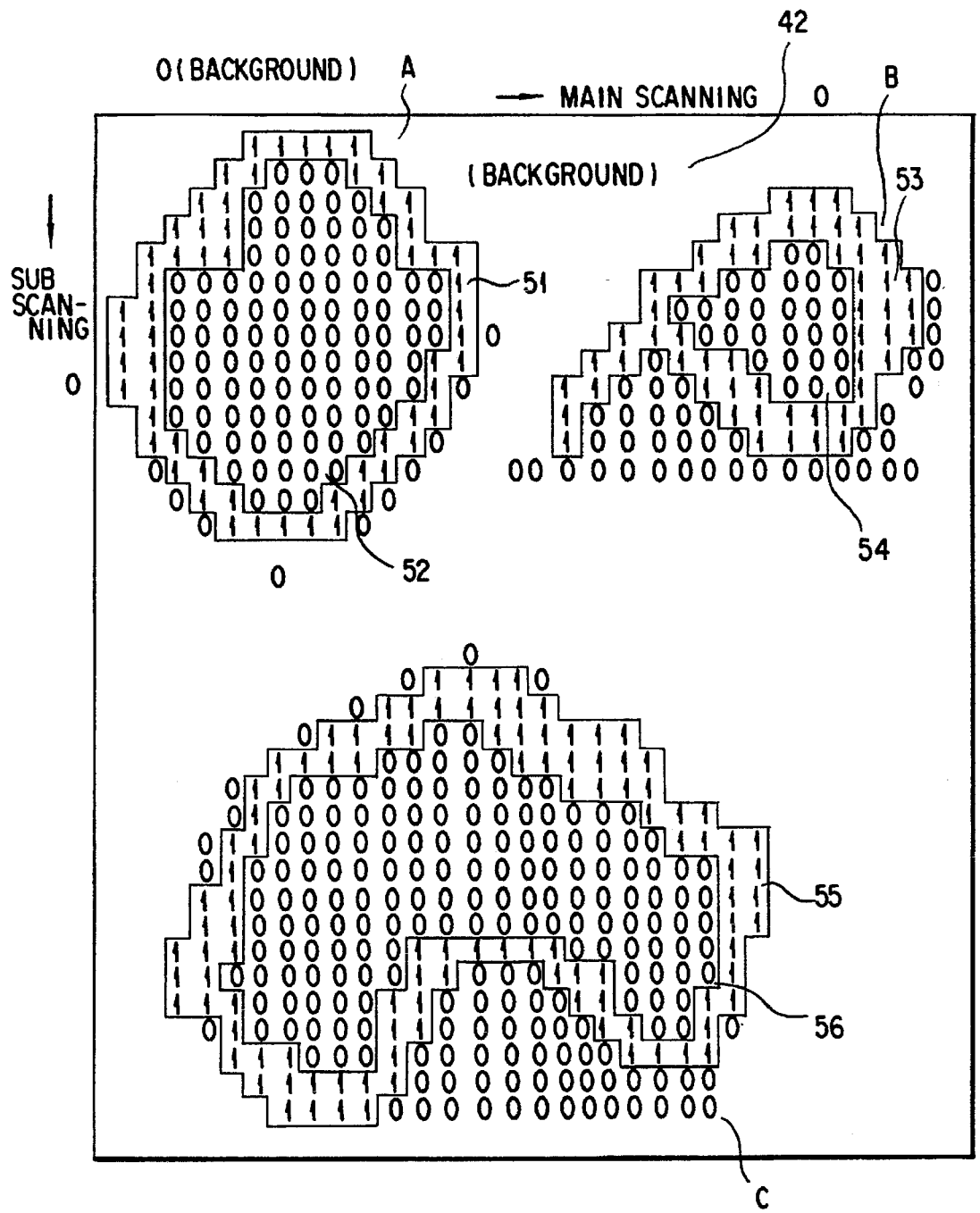
FIG. 5A is a view showing a state in which the binarization results of multi-value image data read by the CCD according to the embodiment of the present invention are written in a frame area.
Figure 5B:
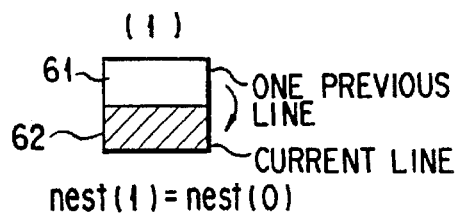
FIGS. 5B–5E are views is a view for explaining a level judging method of judging the levels of the above binary data under a predetermined condition.
Figure 5C:
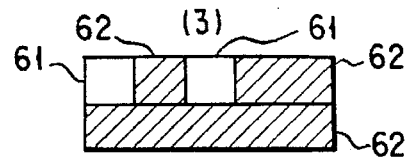
Figure 5D:
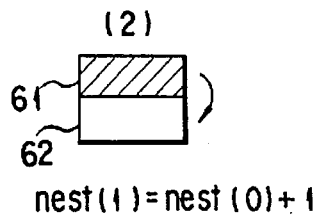
Figure 5E:
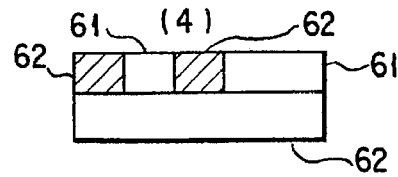
Figure 5F:
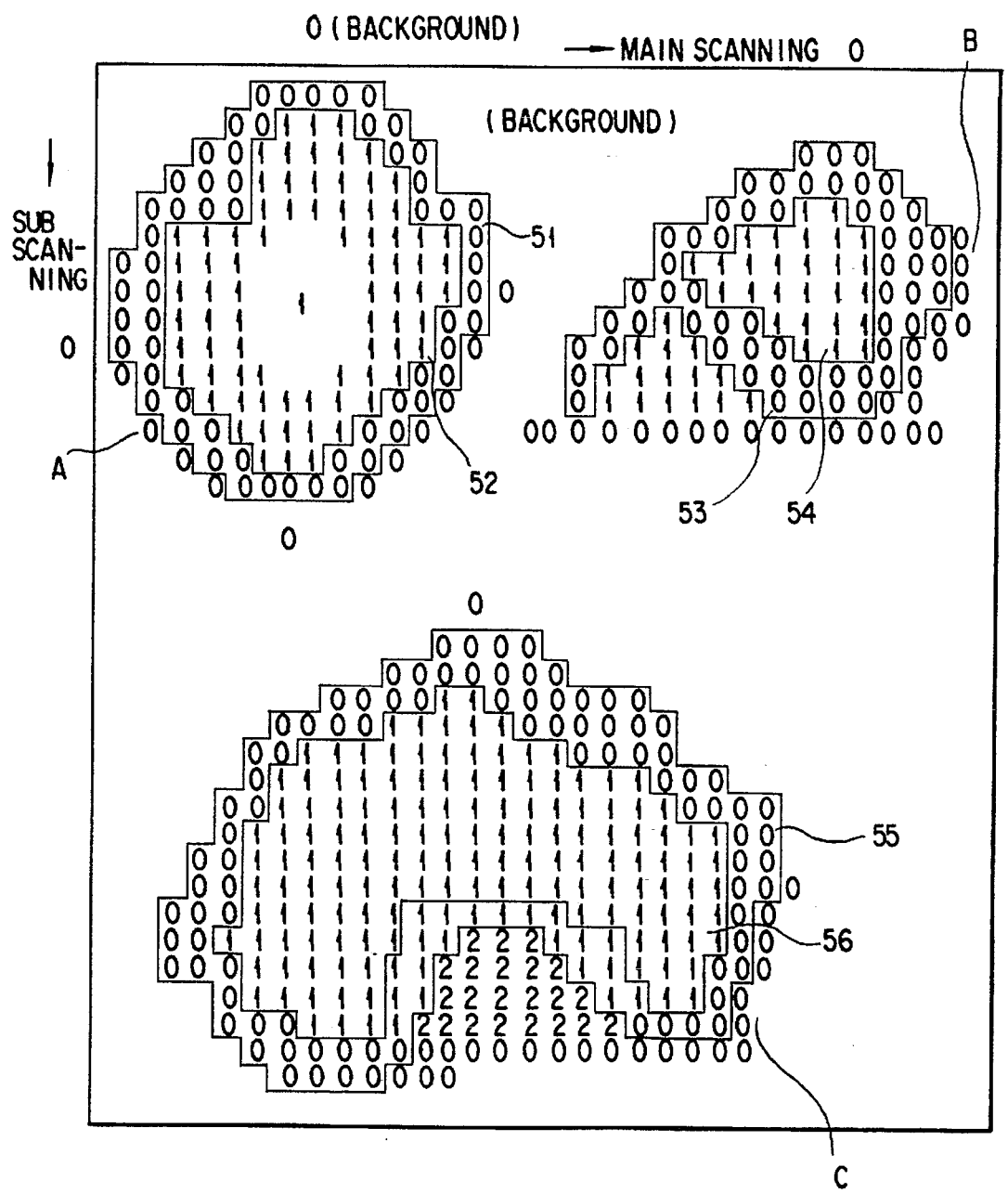
FIGS. 5F and 5G are views showing the results of above level judgment in the frame area.
Figure 5G:
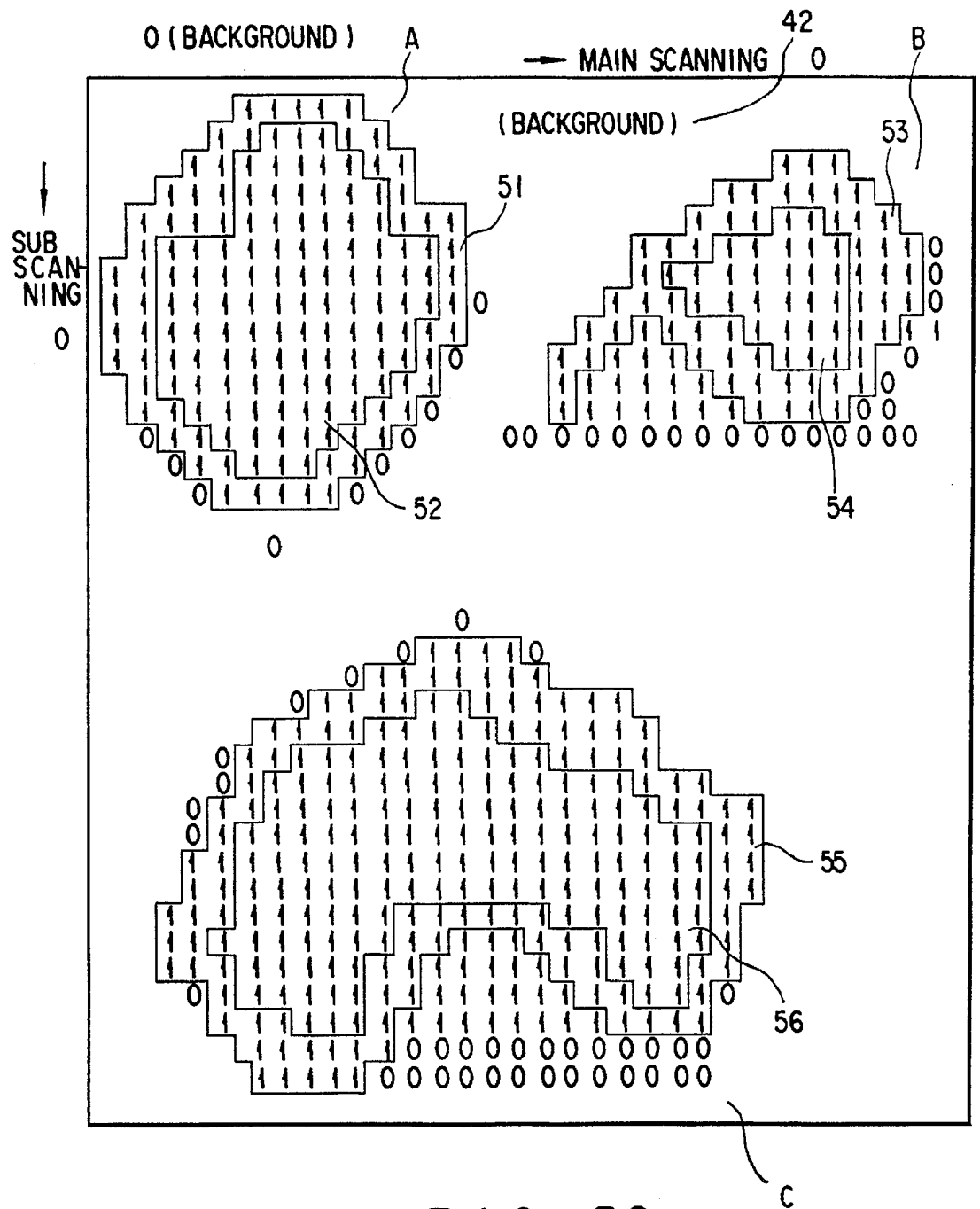
Figure 6:
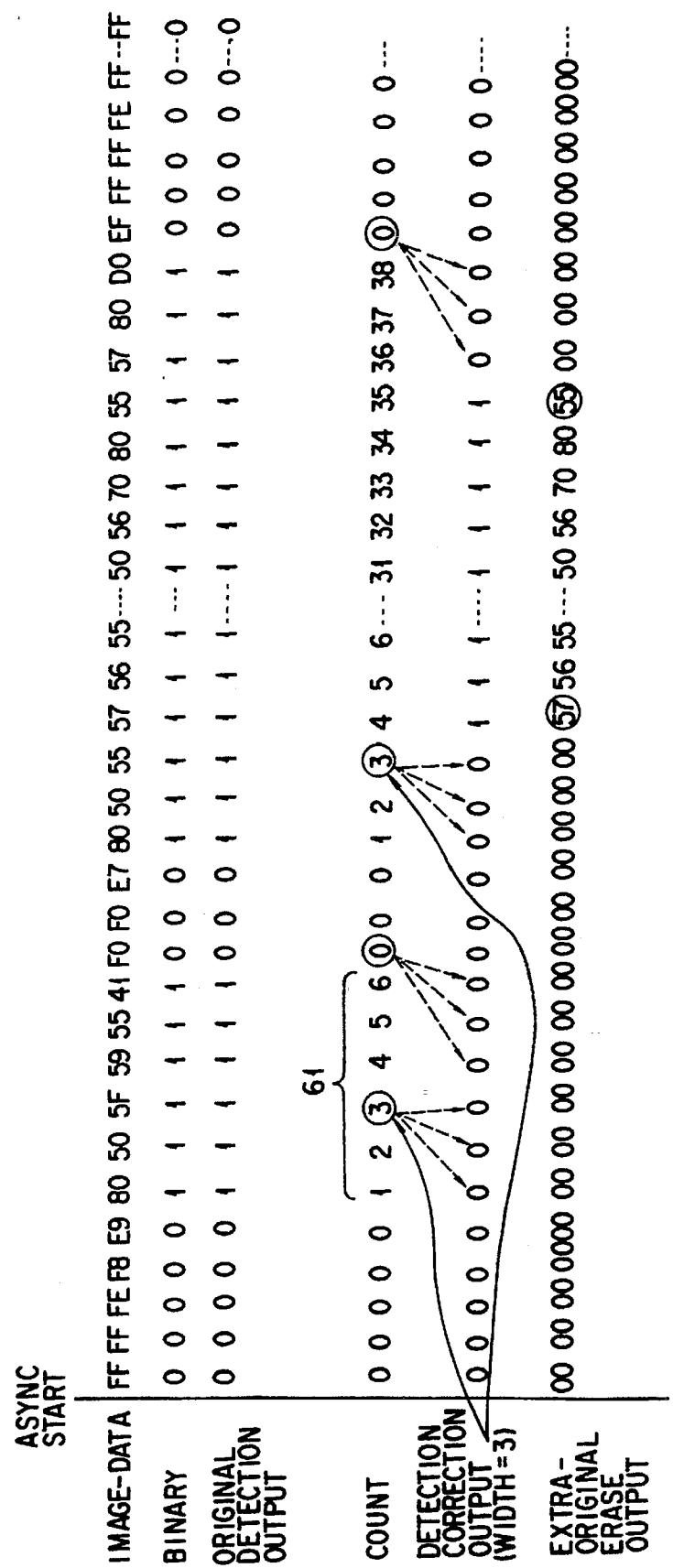
FIG. 6 is a view showing image data for explaining the operation of the embodiment of the present invention.

FIG. 5A is a view showing a state in which the binarization results of multi-value image data read by the CCD according to the embodiment of the present invention are written in a frame area, FIGS. 5B–5E are views for explaining a level judging method of judging the levels of the above binary data under a predetermined condition, FIGS. 5F and 5G are views showing the results of above level judgment in the frame area, and FIG. 6 is a view showing image data for explaining the operation of the embodiment of the present invention.

First, image data of an original range after photoelectric conversion by the CCD is binarized. In binarization, image data and a binarization threshold are compared to perform the following judgment, and a 1-bit result is output. A binarization threshold can be arbitrarily set in the adjustment mode.

(1) If binarization threshold (th)>image data, binary output=1

(2) If binarization threshold (th)≦image data, binary output=0

By this processing, binary data as shown in FIG. 5A are obtained. Referring to FIG. 5A, the originals A, B, and C placed on an original table 42 have irregular shapes, and can be classified by the binary data into central print surface portions 52, 54, and 56 having a high image density and blank portions 51, 53, and 55 respectively surrounding them.

FIG. 6 shows this processing and indicates that image data (first column) expressed by FF, 59, and the like are binarized (second column) in accordance with the threshold.

Subsequently, original detection is performed. As described above, this processing operation utilizes the principle of level judgment disclosed in Jpn. Pat. Appln. KOKAI Publication No. 3-17787.

FIGS. 5B–5E show processing examples and the principle of this intra-frame area level judgment. This judgment is performed to discriminate the print surface portions 52, 54, and 56 from the "background" portions on the original table 42, where the originals A to C do not exist, by detecting the frame portions (portions of the original surface where print surfaces do not exist) 51, 53, and 55 of the originals A to C. Referring to FIGS. 5B–5E, when the distribution of the binary data as shown in FIG. 5A is to be processed, if this processing is executed from the upper portion of the image surface, this processing is divided into four patterns:

(1) when a run on the current line forms a frame (the binary output is 1) 62 and the adjacent previous line forms entirely a background (the binary output is 0) 61, the level of the previous line is succeeded;

(2) when a run on the current line forms a background (the binary output is 0) 61 and the adjacent previous line forms entirely a frame (the binary output is 1) 62, 1 is added to the level of the previous line;

(3) when a run on the current line forms a frame (the binary output is 1) 62 and the adjacent previous line mixedly contains both a background 61 and a frame 62, the minimum value of the level of the frame of the previous line is succeeded; and (4) when a run on the current line forms a background (the binary output is 0) 61 and the adjacent previous line mixedly contains both a background 61 and a frame 62, the minimum value of the level of the background of the previous line is succeeded.

When the data shown in FIG. 5A are subjected to above processing, the distribution of the pixel level shown in FIG. 5F after level judgment is obtained.

Furthermore, the output of original detection processing is determined from the result of this intra-frame area level judgment (FIG. 5F) and the binary outputs (FIG. 5A) in accordance with the following processing, and a 1-bit result (FIG. 5G) is output.

(1) If binary output=1 or the level of the level judgment result is other than 0,
original detection output=1

(2) In cases other than the above case,
original detection output=0

As the result of this processing, the print surface portions 52, 54, and 56, and the background 61 of the originals A to C, which cannot be discriminated from each other since they are both expressed as "0" in the binary data in FIG. 5A, can be clearly discriminated from each other in FIG. 5G such that "1" indicates an original surface portion and "0" indicates a background portion. This original detection processing is indicated by original detection outputs on the third column of FIG. 6.

Referring back to FIG. 3, the embodiment of the present invention will be described. Data of the original detection processor 32 is subjected to detection correction processing in the detection correction processor 33 so that noise of a small area is removed. The processor 33 performs the following processing by using a counter (fourth column in FIG. 6) and a register (fifth column in FIG. 6), and outputs a 1-bit result. The counter is started when the binary signal output from the original detection processor 32 is a pixel of "1", incremented one by one when pixels of "1" continue, and cleared to 0 upon a change of a pixel of "1" to a pixel of "0". A correction width (3 in this example) is set in the register.

(1) The start position (a portion where a change takes place from a pixel of "0" to a pixel of "1") of the original area in the main scanning direction is obtained by replacing, by 0s, pixels that are obtained by subtracting the correction width from the count by comparing the count with the correction width.

(2) The end position (a portion where a change takes place from a pixel of "1" to a pixel of "0") of the original area in the main scanning direction is obtained by replacing, by 0s, pixels that are obtained by subtracting the correction width from the count.

FIG. 6 shows this processing by way of processing between counts (fourth column) and detection correction outputs (fifth column). More specifically, regarding an area whose original detection output is "1" due to the presence of small dust (61 of FIG. 6) although no original actually exists, this area is counted (fourth column) from 1 to 6. When width=3 is set, the third count of "1" from the right and the third count of "1" from the left are respectively replaced by "0s" by detection correction processing. Thus, in the detection correction output (fifth column), the data corresponding to this dust become all "0s", so that data of the dust 61 becomes "00" in the final extra-original erase output as well. Therefore, a phenomenon wherein a portion where no original exists is copied in black does not occur, unlike in the conventional copying machine.

Regarding the correction width, as described above, a preset parameter is set in the register by the CPU before a copying operation is started.

An extra-original erase processor 34 fetches through a delay circuit (D) 35 a binary signal output from the processor 33 and image data to be input to the binarization processor 31 described above, and (1) outputs initial image data if detection correction processing output=1, and (2) replaces the data to white (00) if detection correction processing output=0.

This result is indicated by the extra-original erase output (sixth column) of FIG. 6. Outputs corresponding to portions where the thick originals A to C do not exist or outputs corresponding to small portions, e.g., dust, become "00", and are not copied in black.

Figure 4:
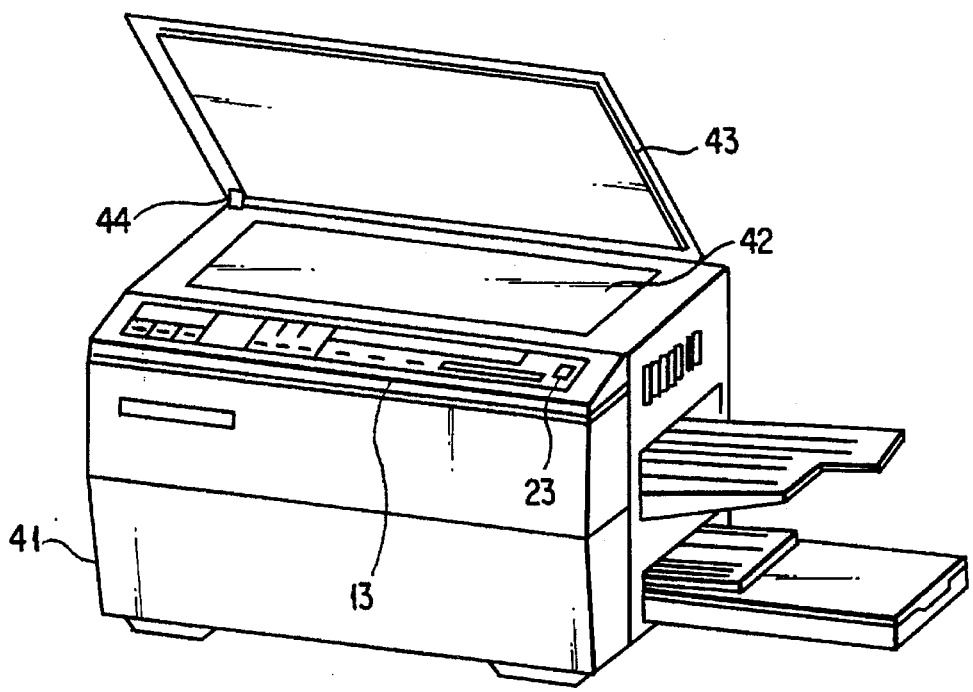
FIG. 4 is a perspective view of the digital copying machine according to the embodiment of the present invention.

The outer appearance of the digital copying machine will be briefly described with reference to FIG. 4. Referring to FIG. 4, reference numeral 41 denotes a copying machine body; 42, an original table disposed on the upper surface of the copying machine body 41; and 43, a platen cover. when the platen cover 43 is opened or closed, it is detected by an opening/closing switch (not shown), and a detection signal from the switch is output to the main controller 11 described above.

The operation of the embodiment of the present invention having the above arrangement will be described. First, a thick original is placed on the original table 42, and while the platen cover 43 is not completely closed, the print key 23 is depressed. The main controller 11 fetches a detection signal from the opening/closing switch (not shown) of the operation panel 13, detects that the platen cover 43 is open, and executes an extra-original removing operation shown in the flow chart of FIG. 7.

Figure 7:
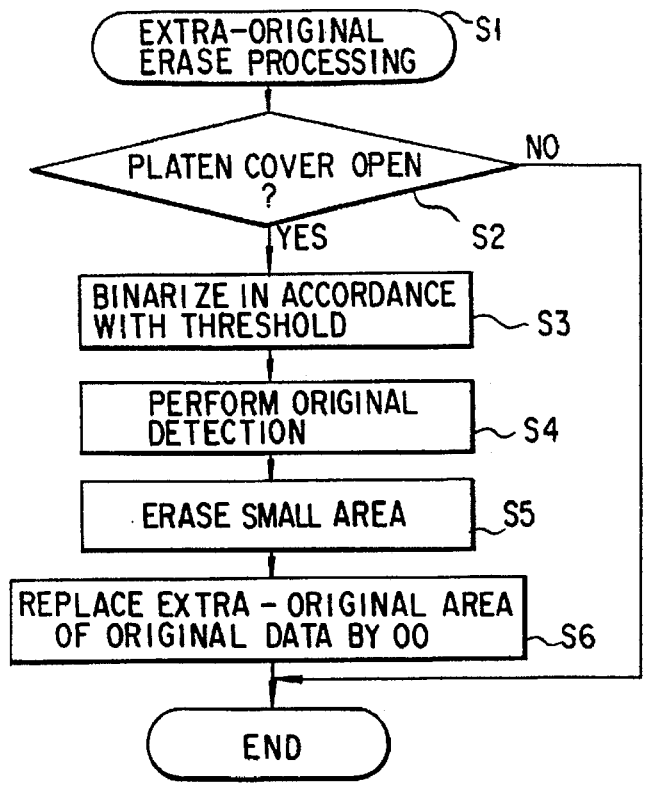
FIG. 7 is a flow chart for explaining the operation of the embodiment of the present invention.

FIG. 7 is a flow chart for explaining the operation of the embodiment of the present invention. Referring to FIG. 7, extra-original erase processing (S1) is started. Whether or not the platen cover is open is determined (S2). If YES in step S2, binarization is performed in accordance with the threshold (S3), and original detection processing (S4) is performed. A small area is erased (S5), and the image data corresponding to the extra-original area of the original data is replaced by "00" (S6). If the platen cover is kept closed, extra-original erase processing is not performed.

The main controller 11 informs the sub-controllers 14 and 15 of the operation the print key 23 in the operation panel 13. The scanner driver 17 and the scanner processor 16 are driven. More specifically, the scanner processor 16 causes the CCD to photoelectrically convert light reflected by the original, thus A/D-converting analog image data to 8-bit image data, and causes the line memory to store the 8-bit image data as 1-line image data. The scanner processor 16 outputs 1-line image data to the image processor 12.

The image data (8 bits) output from the scanner processor 16 (described above) is input to the binarization processor 31 in the image processor 12. The binarization processor 31 compares the 8-bit input image data with an 8-bit threshold Th (e.g., "E0"). If image data≧threshold Th, the binarization processor 31 outputs a binary output "0"; if image data<threshold Th, it outputs a binary output "1" (refer to FIG. 5A and the second column of FIG. 6).

The binary signal output from the binarization processor 31 is input to the frame-and-nest-level original detection processor 32. The frame-and-nest-level original detection processor 32 outputs binary signals (refer to FIG. 5G and the third column of FIG. 6) of the original detection output representing the frame of the original and the nest level to the detection correction processor 33 based on the principle of the intra-frame area detecting apparatus disclosed in Jpn. Pat. Appln. KOKAI Publication No. 3-17787. In this case, the processor 33 performs the following processing by using a counter and a register, and outputs a 1-bit result as a detection correction output (fifth column) shown in FIG. 6. This counter is started when a binary signal output from the original detection processor 32 is a pixel "1", incremented one by one when pixels of "1" continue, and cleared to 0 upon a change from a pixel of "1" to a pixel of "0". A correction width (3 in this example) is set in this register.

(1) The start position (a portion where a change takes place from a pixel of "0" to a pixel of "1") of the original area in the main scanning direction is obtained by replacing, by 0s, pixels that are obtained by subtracting the correction width from the count.

(2) The end position (a portion where a change takes place from a pixel of "1" to a pixel of "0") of the original area in the main scanning direction is obtained by replacing, by 0s, pixels that are obtained by subtracting the correction width from the count.

The count of the counter is cleared to 0. The extra-original erase processor 34 fetches the binary signal output from the detection correction processor 33 and image data to be input to the binarization processor 31 through the delay circuit 35, performs the following processing, and outputs a signal shown in FIG. 6 as an extra-original erase output;

(1) to output initial image data if detection correction processing output=1, and (2) to replace the data by white (00) if detection correction processing output=0.

In this manner, according to the image forming apparatus of the present invention, an extra-original portion of the original can be printed in white, and a small area having a width up to twice a correction width can be printed in white.

Figure 9:
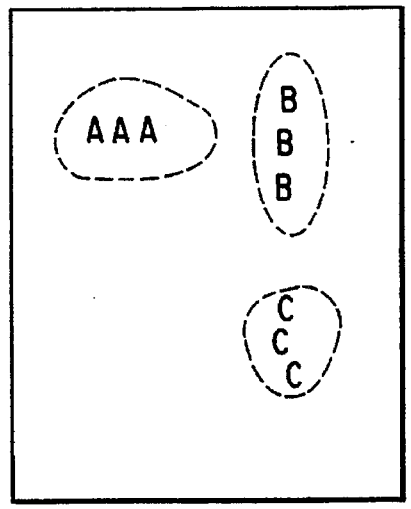
FIG. 9 is a view showing a copy state obtained when copying is performed with the apparatus of this embodiment.
Figure 10A:
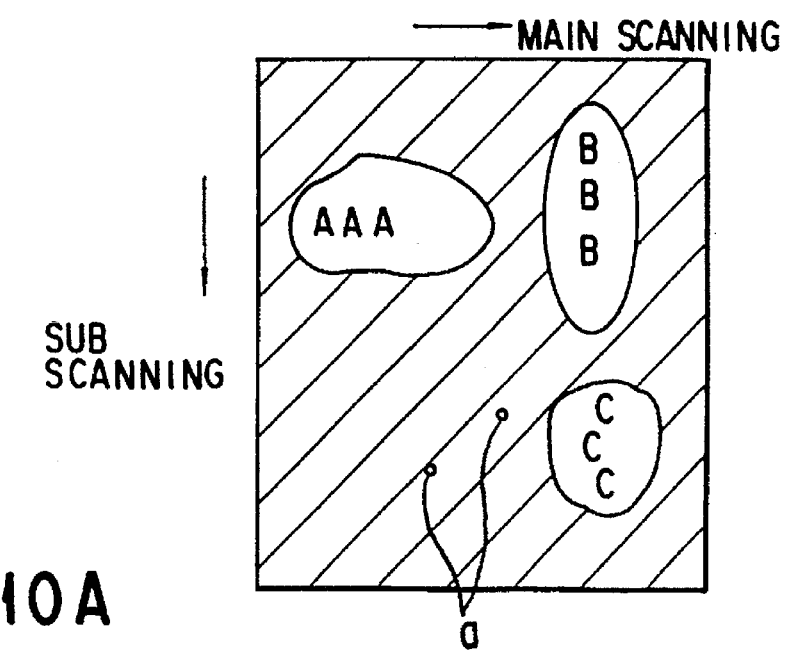
FIGS. 10A and 10B are views showing copy examples of originals that are obtained when the originals are copied with an apparatus to which the present invention is not applied.
Figure 10B:
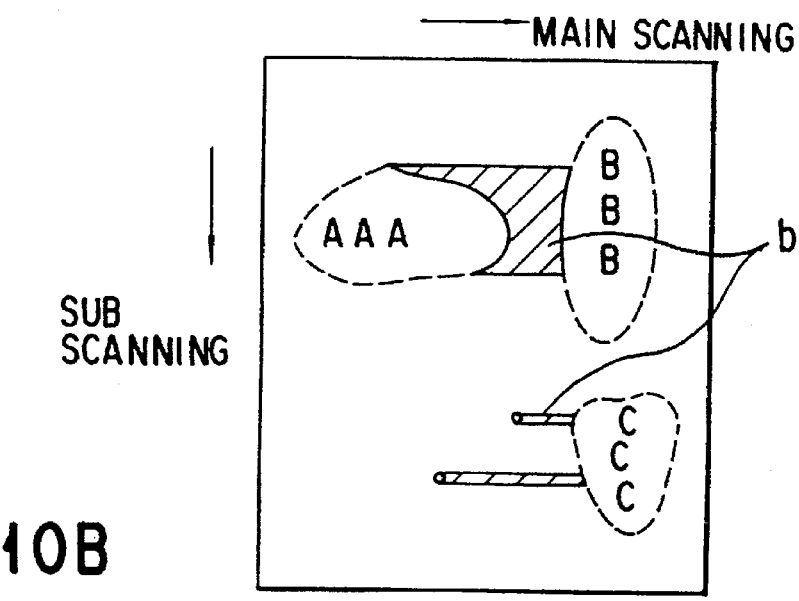

FIG. 9 is a view showing a copy state obtained when copying is performed with the apparatus of this embodiment, and FIGS. 10A and 10B are views showing copy examples of originals that are obtained when the originals are copied with an apparatus to which the present invention is not applied. More specifically, according to the image forming apparatus of the present invention, when the originals "AAA", "BBB", and "CCC" that are identical to those in the conventional case, portions other than the originals "AAA", "BBB", and "CCC" can be printed in white, as shown in FIG. 9.

Furthermore, as shown in FIGS. 5A, 5F, and 5G with respect to the original table 42, the image forming apparatus according to the present invention performs image processing, which has been described above in the explanation of the operation, in both the main scanning and subscanning directions. Conventionally, when extra-original erase is performed only in the main scanning direction, black portions b are formed, as shown in FIG. 10B. In contrast to this, according to the embodiment of the present invention, since above image processing is also performed in the subscanning direction, even an extra-original portion b located between two thick originals can be erased. As a result, as shown in FIG. 9, copying free from a black portion is enabled.

In the above embodiment, the detection correction processor 33 is connected to the output of the frame-and-nest-level original detection processor 32. However, if a small area a need not be deleted, the detection output of the frame-and-nest-level original detection processor 32 may be directly output to the extra-original erase processor 34.

Figure 8A:
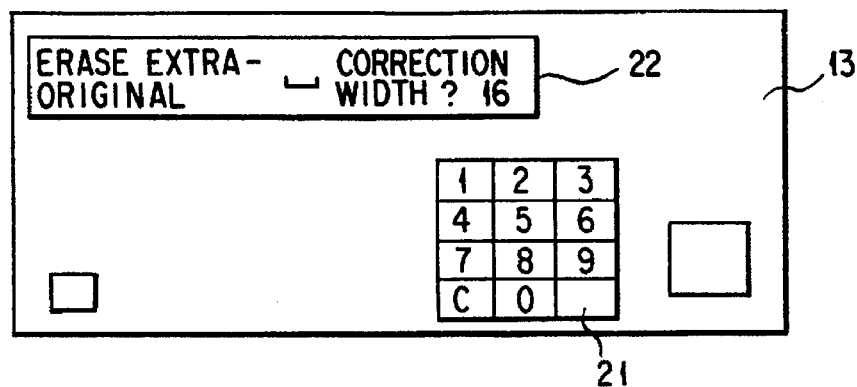
FIGS. 8A and 8B are plan views showing the display contents of the operation panel.
Figure 8B:
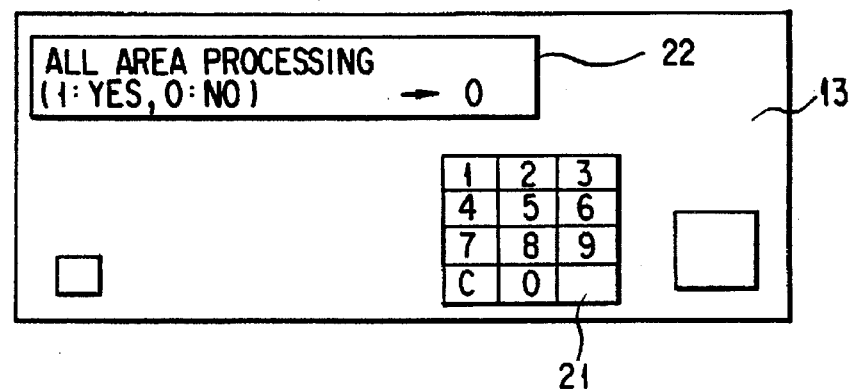

FIGS. 8A and 8B are plan views showing the display contents of the operation panel. Referring to FIGS. 8A, 8B, and 11 showing a modification of the above embodiment, an original placed on an original table 42 is detected by an opening/closing switch 44 (FIG. 4) that detects opening/closing of the platen cover 43. However, as shown in FIG. 2, the processing operation of the flow chart of FIG. 7 may be started by an operation of the extra-original erase mode switch 24. In this case, a correction width may be set, as shown in FIG. 8A, or a processing range may be set, as shown in FIG. 8B.

Alternatively, an original area is input by means of X- and Y-coordinates to specify the original area by the operator by using the ten-key input section 21 of the operation panel 13, the message display 22, and the like shown in, e.g., FIG. 8A.

As has been described above, according to the present invention, there is provided an image forming apparatus which, even when a plurality of originals exist in the main scanning direction, does not copy a portion between adjacent originals in black, and does not copy a portion between a small area and an adjacent original in black.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus comprising:

first scanning means for radiating light to a target area including an original image area, scanning the target area in a predetermined direction, and converting an optical image obtained by the scanning to an electrical signal;

second scanning means for radiating light to the target area including the original image area, scanning the target area in a direction perpendicular to the direction in which said first scanning means scans, and converting an optical image obtained by the scanning to an electrical signal;

means for converting the electrical signals obtained by said first and second scanning means to digital signals;

means for abstracting an area in the target area surrounded by a low-density portion based on the digital signals obtained by said converting means;

means for judging the area surrounded by the low-density portion as an original area and an area other than the original area as an extra-original area; and means, which forms an image based on image signals obtained by scanning and conversion by said first and second scanning means, for forming an image to exclude the extra-original area judged by said judging means.

2. An apparatus according to claim 1, further comprising means for recognizing an open/closed state of a cover covering an original table on which the original is placed and, if said cover is kept closed, causing said image forming means to form an image to include the extra-original area.

3. An apparatus according to claim 1, further comprising means for setting the original area, so that said image forming means forms an image to exclude the extra-original area specified by the preset original area.

4. An apparatus according to claim 3, wherein said setting means includes input keys for setting X- and Y-coordinates that specify the original area.

5. An apparatus according to claim 1, further comprising means for causing said image forming means to perform copying to include the extra-original area when externally operated.

6. An image forming apparatus comprising:

means for radiating light to a target area including an original image area, scanning the target area in a predetermined direction, and converting an optical image obtained by scanning to an electrical signal;

means for changing the electrical signal obtained by said scanning means to a digital signal;

means for abstracting an area in the target area surrounded by a low-density portion based on the digital signal;

means for determining the area of the original image area when the area is larger than a predetermined range, and for determining the area of an extra-original area when the area is less than the predetermined range; and means for forming an image of the original image area without the extra-original area.

7. An apparatus according to claim 6, further comprising means for recognizing an open/closed state of a cover covering an original table on which the original is placed and, if said cover is kept closed, causing said image forming means to form an image to include the extra-original area.

8. An apparatus according to claim 6, further comprising means for setting a value of the predetermined range of said judging means.

9. An apparatus according to claim 6, further comprising means for setting the original area, so that said image forming means forms an image to exclude the extra-original area specified by the set original area.

10. An apparatus according to claim 9, wherein said setting means includes input keys for setting X- and Y-coordinates that specify the original area.

11. An apparatus according to claim 6, further comprising means for causing said image forming means to perform copying to include the extra-original area when externally operated.

12. An image forming apparatus; for forming an image corresponding to an original, the original including a background portion and a plurality of image portions located to be separated from each other within the background portion, the image forming apparatus comprising:

means for scanning the original to generate electrical signals;

means for abstracting, as individual image areas, an area including the plurality of image portions surrounded by the background portion on the basis of the electrical signals and wherein the abstracting means includes means for extracting a given area as an image area when the given area surrounded by the background portion is larger than a predetermined range; and means for forming an image based on the image portion in accordance with the electrical signal, which electrical signal corresponds to the image portions included in the image area abstracted by the abstracting means.

13. An image forming apparatus according to claim 12, further comprising:

means for outputting first data for giving a corresponding density to the image portion included in the image area and second data for giving a corresponding density to the background portion.

* * * * *